United States Patent
Yun et al.

(10) Patent No.: US 7,832,877 B2
(45) Date of Patent: *Nov. 16, 2010

(54) OPTICAL MODULATORS INCLUDING INCORPORATED INTO MOBILE TERMINAL PROJECTOR

(75) Inventors: Sang Kyeong Yun, Gyeonggi-do (KR); In Jae Yeo, Gyeonggi-do (KR); Haeng Seok Yang, Gyeonggi-do (KR); Chun Gi Kim, Gyeonggi-do (KR); Kyu Bum Han, Gyeonggi-do (KR); Seung Won Ryu, Gyeonggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1266 days.

This patent is subject to a terminal disclaimer.

(21) Appl. No.: 11/393,260

(22) Filed: Mar. 30, 2006

(65) Prior Publication Data

US 2006/0267858 A1    Nov. 30, 2006

(30) Foreign Application Priority Data

May 25, 2005  (KR)  ............. 10-2005-0044045
Oct. 6, 2005  (KR)  ............. 10-2005-0094038
Nov. 17, 2005  (KR)  ............. 10-2005-0110335

(51) Int. Cl.
*G03B 21/28*  (2006.01)
*G03B 21/00*  (2006.01)
*G02B 26/00*  (2006.01)
*G02B 5/18*   (2006.01)

(52) U.S. Cl. ............. 353/99; 353/122; 359/290; 359/291; 359/572

(58) Field of Classification Search ............. 353/14, 353/34, 82, 85, 99, 119, 122; 359/305, 558, 359/567–568, 231, 237, 290–291, 572; 348/744, 348/789; 345/77, 360, 690; 250/231.14
See application file for complete search history.

(56) References Cited

U.S. PATENT DOCUMENTS

| | | | | |
|---|---|---|---|---|
| 5,841,579 A | * | 11/1998 | Bloom et al. | 359/572 |
| 5,982,553 A | * | 11/1999 | Bloom et al. | 359/627 |
| 6,307,663 B1 | * | 10/2001 | Kowarz | 359/231 |
| 6,373,549 B1 | * | 4/2002 | Tombling et al. | 349/201 |
| 6,411,425 B1 | * | 6/2002 | Kowarz et al. | 359/291 |
| 6,489,934 B1 | * | 12/2002 | Klausner | 345/1.1 |

(Continued)

FOREIGN PATENT DOCUMENTS

EP    1454179 A    5/2003

(Continued)

*Primary Examiner*—Georgia Y Epps
*Assistant Examiner*—Jori S Reilly-Diakun
(74) *Attorney, Agent, or Firm*—Christensen O'Connor Johnson Kindness PLLC

(57) ABSTRACT

A mobile terminal includes an optical modulation projector. The mobile terminal also includes a control system, a projection control unit, and an optical modulation system. The control system outputs a projection control signal and image data. The projection control unit receives the image data from the control system, and generates and outputs a drive control signal depending on the image data received. The optical modulation system generates and modulates light and generates an image in response to the drive control signal and then scans the image for projecting onto a screen.

17 Claims, 8 Drawing Sheets

U.S. PATENT DOCUMENTS

| | | | | |
|---|---|---|---|---|
| 6,724,509 | B2* | 4/2004 | Lee | 359/199.2 |
| 7,133,184 | B2* | 11/2006 | Shin et al. | 359/291 |
| 7,170,668 | B2* | 1/2007 | Yun | 359/291 |
| 7,173,751 | B2* | 2/2007 | Yun | 359/291 |
| 7,209,290 | B2* | 4/2007 | An et al. | 359/572 |
| 7,271,958 | B2* | 9/2007 | Yoon et al. | 359/572 |
| 7,289,258 | B2* | 10/2007 | Hong et al. | 359/290 |
| 7,382,517 | B2* | 6/2008 | Yun | 359/291 |
| 7,446,922 | B2* | 11/2008 | An et al. | 359/237 |
| 2003/0043124 | A1* | 3/2003 | Kim et al. | 345/204 |
| 2003/0061414 | A1* | 3/2003 | Richardson | 710/22 |
| 2004/0017518 | A1* | 1/2004 | Stern et al. | 348/744 |
| 2005/0174540 | A1 | 8/2005 | Mekuria | |
| 2007/0070310 | A1* | 3/2007 | Ryu et al. | 353/122 |
| 2008/0186561 | A1* | 8/2008 | Yun | 359/291 |

FOREIGN PATENT DOCUMENTS

| | | |
|---|---|---|
| EP | 1504596 A | 11/2003 |
| EP | 1550303 A | 4/2004 |

* cited by examiner

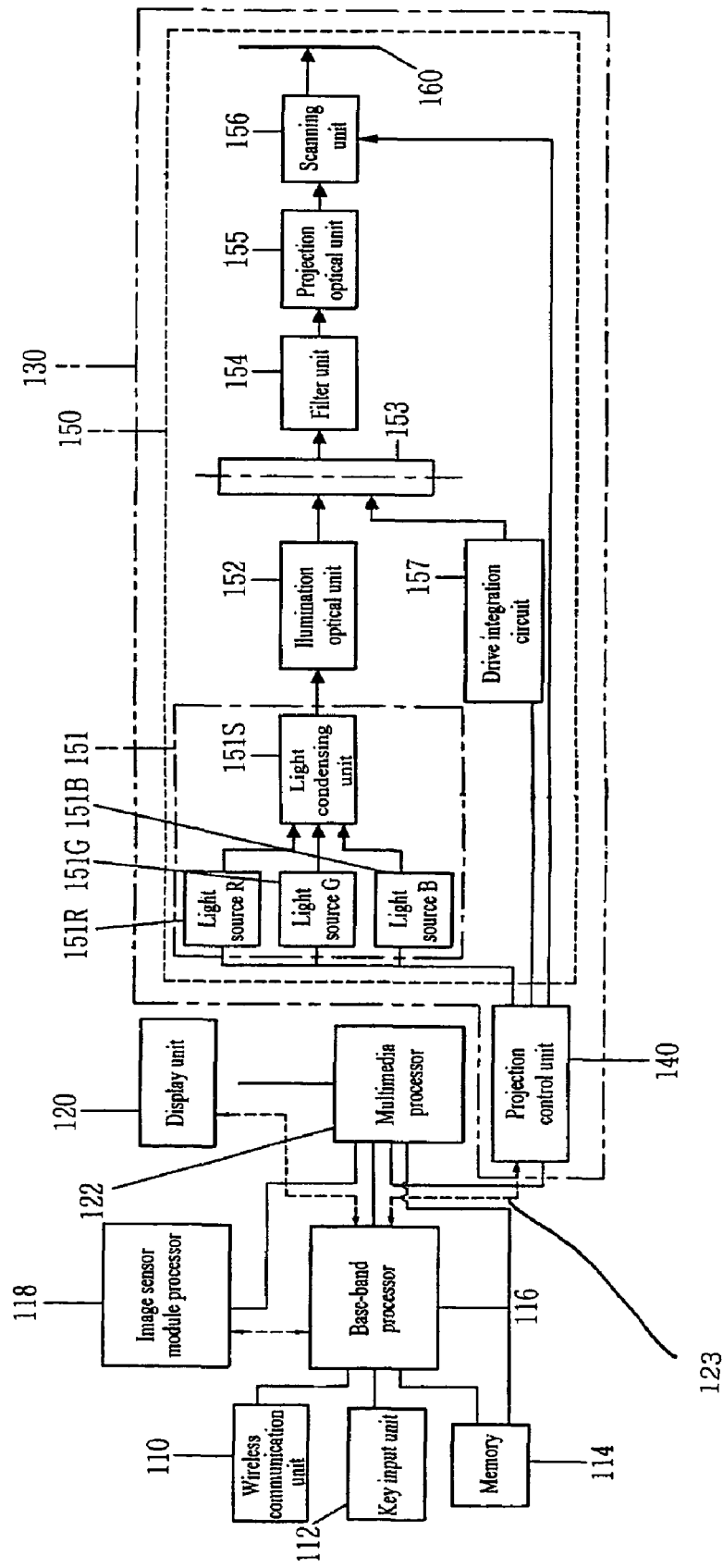

Input data sequence

OPTICAL MODULATORS INCLUDING INCORPORATED INTO MOBILE TERMINAL PROJECTOR

BACKGROUND

1. Technical Field

The present invention relates generally to a mobile terminal having an optical modulation projector, which generates an image by modulating light generated from a light source using an optical modulator, and enlarges and projects the generated image onto a screen, thus displaying the image onto the screen.

2. Description of the Related Art

Currently, with the rapid development of the electronics industry and information and communications technology, information about various characters and images is processed using terminals, such as desktop Personal Computers (PCs), notebook PCs and mobile phones, in almost all industries. Particularly, as the application of information using Internet increases, information processing work is trending toward being performed through connection with the Internet using mobile phones as well as existing desktop or notebook PCs.

However, in the display devices of the terminals, such as desktop PCs, notebook PCs and mobile phones, a monitor based on a predetermined standard is integrated with the main body of the terminal, so that a problem occurs in that the viewing range and readability of the screen thereof are limited.

For example, a Cathode Ray Tube (CRT) monitor, which is the display device of a desktop PC, is problematic in that conditions for installation are disadvantageous, and it is inappropriate to carry it because the screen size thereof is limited, the volume thereof is large, the weight thereof is heavy, and a relatively high drive voltage is necessary, and the viewing range thereof is limited only to the front of the screen thereof because the direction of the screen thereof is oriented to the front of a user.

Furthermore, a liquid crystal display (LCD) device, which is the display device of a notebook PC, is disadvantageous in that the size of the screen thereof is further limited compared to that of the CRT, and, with regard to the direction of a screen, the viewing range is limited only to the front of the user because the LCD device is integrated with the main body of the notebook.

Furthermore, an LCD device, which is the display device of the mobile phone, is problematic in that the viewing angle range and information displaying area thereof are narrowly limited because the screen size thereof is very small, and readability is low because the size of characters is very small. Particularly, the LCD of an Internet mobile phone, which is provided with a web browser and is connected to the Internet, is problematic in that a full-sized Internet page cannot be displayed on the screen thereof because the display area of a unit frame is limited.

The desktop PCs, the notebook PCs, and the mobile phones described above are disadvantageous in that they incur considerable inconvenience due to the above-described problems when it is necessary for several persons to view one display screen, and the screens thereof cannot be viewed at all from the both sides or rear sides of the monitors thereof.

To solve these problems, a liquid crystal projector, which is a display device that is connectable to a desktop PC, a notebook PC or a mobile phone using a connector, performs the interface of data for the terminal of the desktop PC, the notebook PC or the mobile phone, and projects an image onto the screen thereof through a TFT LCD device and a lens screen, proposed. However, this projector is problematic in that a bright light source appropriate for a long-distance projection scheme is required, the volume of its device is large, and it is difficult to carry the projector.

SUMMARY

A mobile terminal includes a built-in optical modulation projector, which generates an image by modulating light emitted from a light source using an optical modulator, enlarges and project the image onto a screen, so that demands for compactness and low power, for which a mobile phone generally demands, can be satisfied.

In order to accomplish the above object, the present invention provides a mobile terminal having an optical modulation projector, the mobile terminal including a terminal control system for outputting a projection control signal and image data; a projection control unit for receiving the image data from the terminal control system, and generating and outputting a drive control signal depending on the image data when the projection control signal is received from the terminal control system; and a light modulation optical system for generating and modulating light and generating an image in response to the drive control signal when the drive control signal is received from the projection control unit, and performing scanning while enlarging and projecting the generated image onto a screen.

BRIEF DESCRIPTION OF THE DRAWINGS

The above and other objects, features and advantages of the present invention will be more clearly understood from the following detailed description taken in conjunction with the accompanying drawings, in which:

FIG. 2 is a block diagram showing the construction of the mobile terminal provided with an optical modulation projector according to an embodiment of the present invention;

DETAILED DESCRIPTION

An embodiment of the present invention is described in detail with reference to the accompanying drawings below pertaining to a mobile phone. However, it is to be understood that the mobile projected described below may be incorporated into other mobile devices, including PDAG MP3 units, wristwatches, laptop computers, cameras, etc. Thus, reference to a "mobile terminal" as used herein includes these additional devices as well as other similar devices.

Figure 1A:
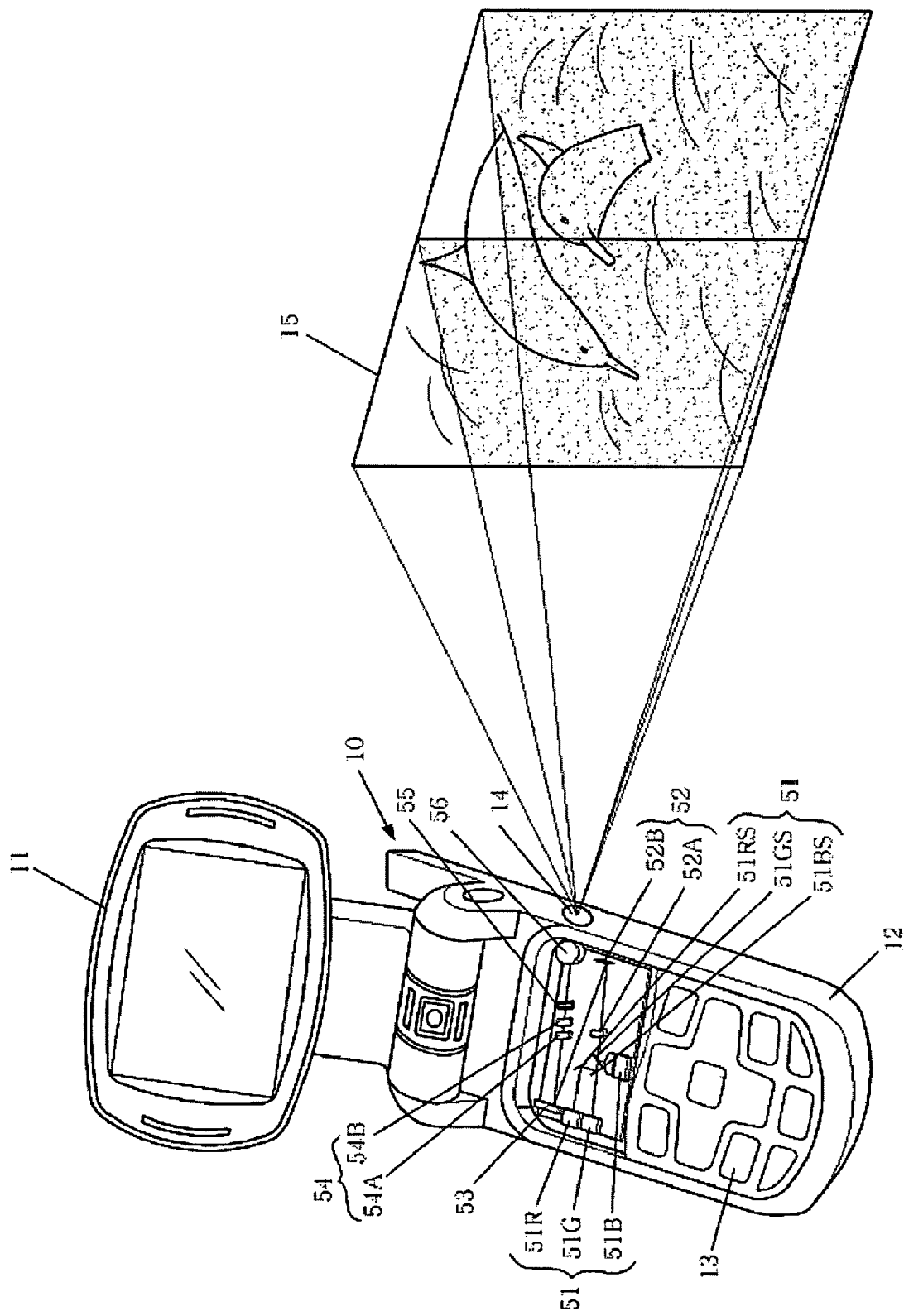
FIGS. 1A and 1B are partially cut-away perspective views showing mobile terminals provided with an optical modulation projector according to an embodiment of the present invention.
Figure 1B:
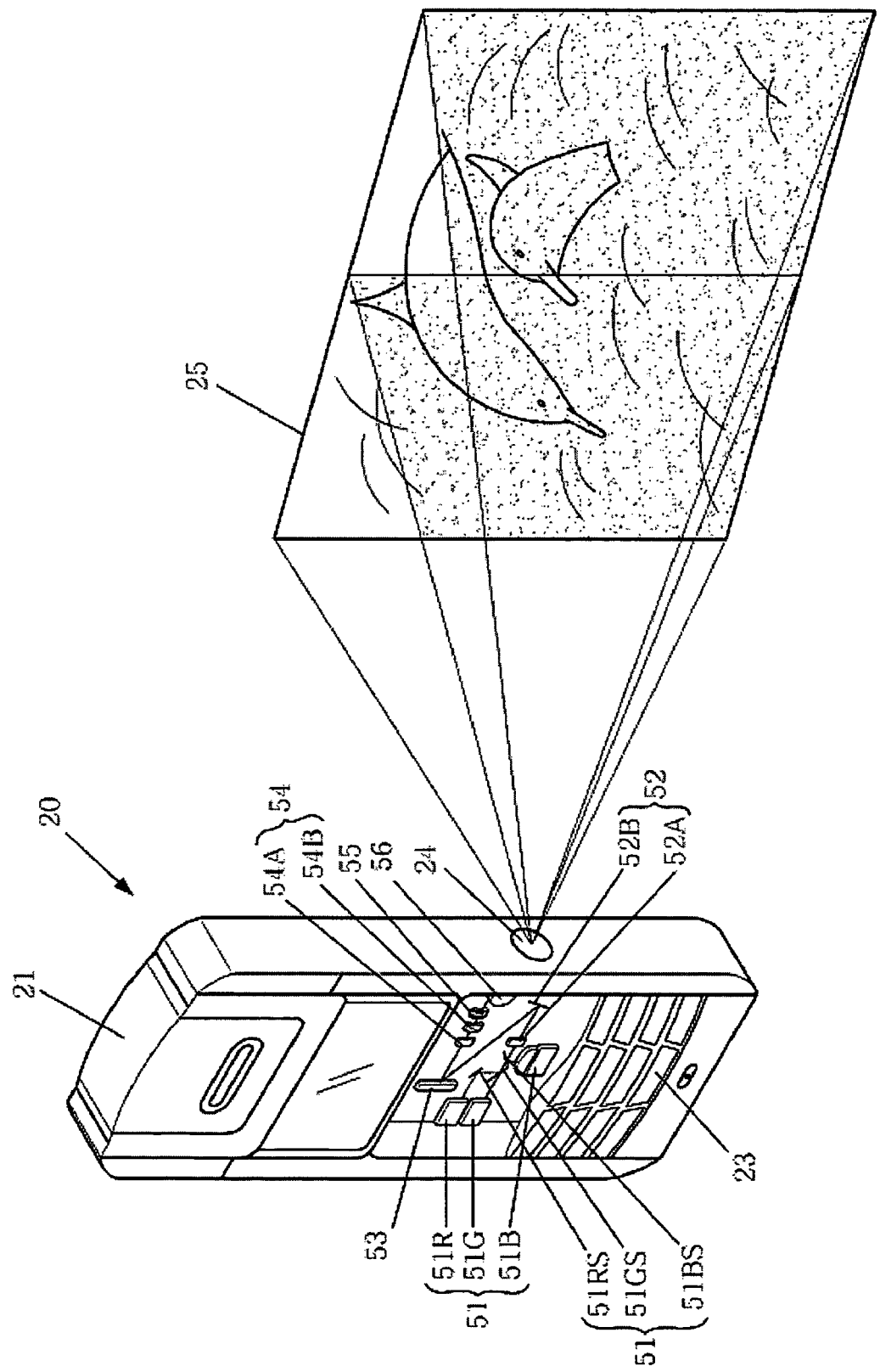

FIG. 1A is a partially cut-away perspective view of a folder-type mobile terminal provided with a mobile projector according to an embodiment of the present invention, and FIG. 1B is a partially cut-away perspective view of a slide type mobile terminal provided with a mobile projector according to an embodiment of the present invention.

Referring to FIG. 1A, when a user selects a projection mode using a keypad 13 and selects an image desired to be displayed (in this case, the projection mode refers to a mode for displaying an image onto an external screen), the folder-type mobile terminal 10 provided with a mobile projector according to an embodiment of the present invention performs image display in such as manner as to generate an image by driving the mobile projector provided therein, enlarge and project the image onto an external screen 15 through a opening part 14 disposed on the right side surface thereof.

The mobile projector, as shown in the partially cut interior of FIG. 1A, is provided with an light modulation optical system including a light source system 51 for generating light beams having respective colors Red (R), Green (G) and Blue (B), and causing the generated light beams to be located along a single path, an illumination optical unit 52 for emitting light, which is generated by the light source system 51, to a diffractive optical modulator 53, the diffractive optical modulator 53 for generating diffracted light having a plurality of diffraction orders by modulating incident light, and generating an image based on the diffracted light, a filter unit 54 for passing diffracted light having a desired order, which belongs to the diffracted light that is generated by the diffractive optical modulator 53 and has a plurality of orders of diffraction coefficients, therethrough, a projection optical unit 55 for enlarging and projecting the diffracted light passing through the filter unit 54, and a scanning unit 56 for scanning the diffracted light, which is enlarged and projected by the projection optical unit 55, onto a screen 15, thus generating an image.

The light source system 51 includes light source R 51R, light source G 51G, and a light source B 51B, and also includes a condensing unit 51S. The condensing unit 51S includes a mirror 51RS for reflecting incident light R to condense the light R, a dichronic mirror 51GS for reflecting the light R and passing the light G therethrough to condense the light R and the light G, and a dichronic mirror 51BS for passing the light R and the light G therethrough and reflecting the light B to condensing the light R, the light G and the light B. The light modulation optical system, as shown in FIG. 2, generates an image under the control of a projection control unit 140, and the projection control unit 140 is controlled by the multimedia processor 122. In the case where the multimedia processor 122 is not provided in the folder-type mobile phone, the projection control unit 140 is controlled by the base-band processor, 116 as indicated by a dotted line 123.

Meanwhile, referring to FIG. 1B, when the user selects a projection mode using a keypad 23 and selects an image desired to be displayed, the slide type mobile terminal 20 provided with a mobile projector according to an embodiment of the present invention performs image display in such as manner as to generate the image by driving a mobile projector provided therein, and enlarges and projects the enlarged image on an external screen 25 through the opening part 24 disposed on the right side surface thereof. The reference numeral 21 indicates a cover.

The mobile projector, as shown in the partially cut interior of FIG. 1B, is provided with an light modulation optical system including a light source system 51, an illumination optical unit 52, a diffractive optical modulator 53, a filter unit 54, a projection optical unit 55, and a scanning unit 56, which are the same as those of the folder-type mobile terminal 10 of FIG. 1A.

The light modulation optical system, as shown in FIG. 2, also generates an image under the control of a projection control unit 140, and the projection control unit 140 is controlled by the multimedia processor 122. In the case where the multimedia processor 122 is not provided in the slide type mobile phone, the projection control unit 140 is controlled by the base-band processor 116, as indicated by a dotted line 123. It is to be understood that if the mobile terminal is of a nature other than a mobile phone, the base-band processor may be replaced by a different type of processor. Thus, reference to base-band processor 116 is also to include reference to other types of processors of the nature used in the various "mobile terminals" noted above.

FIG. 2 is a block diagram showing the construction of the mobile terminal provided with a mobile projector according to an embodiment of the present invention.

As shown in FIG. 2, the mobile terminal provided with the mobile projector 130 according to an embodiment of the present invention includes a wireless communication unit 110 for performing wireless communication, a key input unit 112 for inputting information, memory 114 for storing image data and the like, a base-band processor 116a for performing the overall control of a multimedia processor 122 and the like and, thereby, causing an image to be displayed on a display unit 120 or to be projected onto a screen 160, an image sensor module processor 118 for processing images received from a provided camera or the like, and transmitting processed image data to the multimedia processor 122, the display unit 120 for receiving the image data from multimedia processor 122, and causing an image based on the received image data to be displayed, the multimedia processor 122 for storing the image received from the image sensor module processor 118 in memory 114, or transmitting it to the display unit 120 or a projection control unit 140 to thus be displayed or projected, and reading the image data stored in the memory 114 and transmitting the read data to the display unit 120 or the projection control unit 140 and therefore, causing an image to be displayed on a liquid crystal screen or to be projected onto the screen 160, when an image display control signal or an image projection control signal is received from the base-band processor 116, a mobile projector 130 for generating an image based on the image data received from the multimedia processor 122 and then projecting the generated image onto the screen 160. The multimedia processor 122 and the base-band processor 116 are together named a "terminal control system". As will be appreciated and as noted above, if the mobile terminal is a PDA or other device, and not a mobile phone, the base-band processor may be replaced with another type of processor that is capable of performing functions corresponding to the applicable functions of the base-band processor.

Meanwhile, the dotted lines of FIG. 2 indicate the flow of signals, such as image data, in the case where the multimedia processor 122 is not provided in the mobile phone. With reference to FIG. 2, in the case where the multimedia processor 122 is not provided, the image sensor module processor 118 processes images received from a camera or the like and transmits processed image data to the base-band processor 116. The display unit 120 receives the image data from the base-band processor 116 and causes an image based on the received image data to be displayed onto the screen thereof. The base-band processor 116 stores the image received from the image sensor module processor 118 to the memory 114, and transmits it to the display unit 120 or the projection control unit 140 to thus be displayed or projected. Furthermore, the base-band processor 116 reads the image data stored in the memory 114, transmits it to the display unit 120 or the projection control unit 140 and, therefore, causes the image to be displayed on the liquid crystal screen or to be projected onto the screen 160.

When a projection control signal and image data are received from the multimedia processor 122 (the base-band processor 116 performs the same function in the case where the multimedia processor 122 is not provided), the mobile projector 130 according to the present invention includes the projection control unit 140 that controls the light modulation optical system 150 such that the light modulation optical system 150 generates an image based on the received image data, and the light modulation optical system 150 generates an image based on the projection control signal and the image data received from the projection control unit 140. This image is projectable onto the screen 160.

Figure 3:
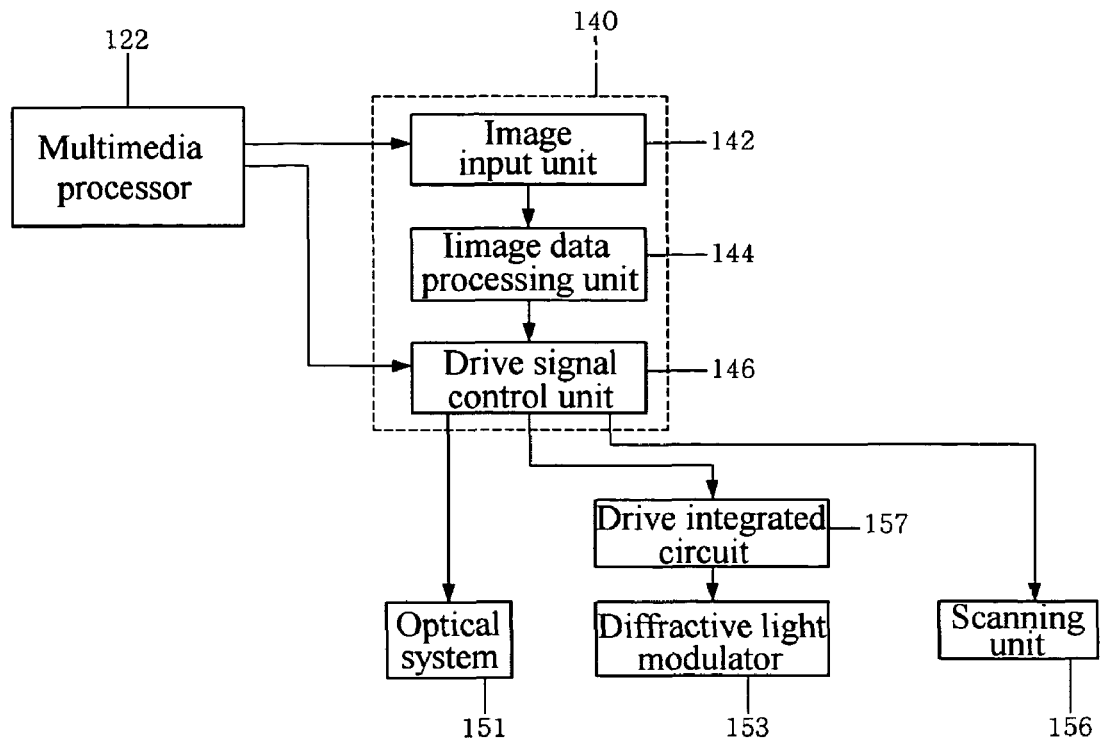
FIG. 3 is a block diagram showing the internal construction of the projection drive unit of FIG. 2.

The projection control unit 140, as shown in FIG. 3, includes an image input unit 142, an image data processing unit 144, and a drive signal control unit 146.

Furthermore, the light modulation optical system 150 includes a light source system 151 for generating and emitting an RGB light source, a illumination optical unit 152 for causing the light emitted from the light source system 151 to enter into a diffractive optical modulator 153, the diffractive optical modulator 153 for diffracting incident light received from the illumination optical unit 152, thus generating an image (that is, the illumination optical unit 152 diffracts incident light and forms diffracted light having a plurality of orders, and the desired image is generated based on diffracted light having one order or a plurality of orders, which belongs to the diffracted light having the plurality of orders), a filter unit 154 for passing diffracted light having a desired order, which belongs to the diffracted light that is generated by the diffractive optical modulator 153 and has the plurality of orders, therethrough, a projection optical unit 155 for enlarging and projecting an image based on the diffracted light passing through the filter 154, a scanning unit 156 for scanning the image onto the screen 160, a drive integrated circuit 157 for generating a drive signal based on the projection control signal and the image data received from the projection control unit 140 and driving the diffractive optical modulator 153.

Meanwhile, the image input unit 142 of the projection control unit 140 receives the image data from the multimedia processor 122, and directly receives the image data from the base-band processor 116 in the case where the multimedia processor 122 is not provided.

Furthermore, the image data processing unit 144 of the projection control unit 140 performs data transposing such that the image data arranged in a transverse direction is transposed in a longitudinal direction and, thereby, outputs the image data arranged in the longitudinal direction obtained by performing the data transposing. As described above, the reason it is necessary to perform the data transposing in the image data processing unit 144 is because in the light modulation optical system 150 using the diffractive optical modulator 153, a plurality of pixels are arranged in a longitudinal direction, so that an image can be displayed by scanning in a transverse direction.

Figure 4A:
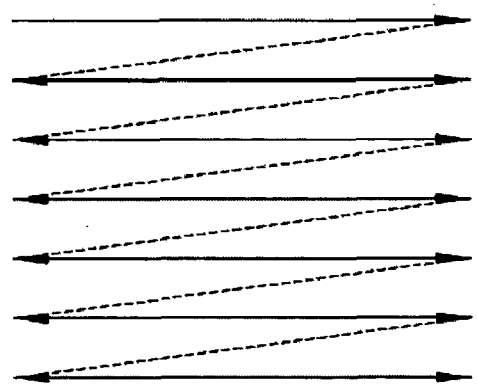
FIG. 4A is a diagram conceptually showing the input data sequence of raster type standard input image data.
Figure 4B:
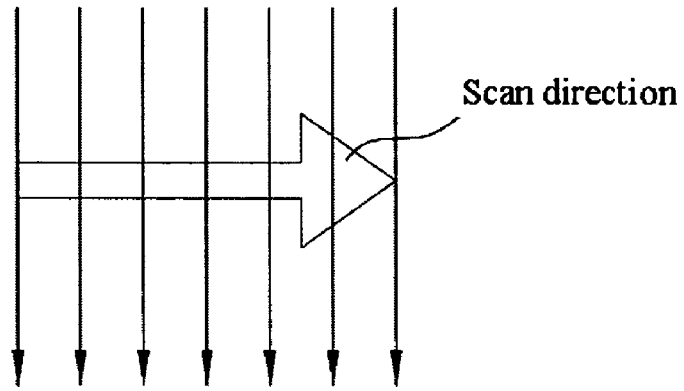
FIG. 4B is a diagram conceptually showing an output data sequence and a scan direction according to the present invention.
Figure 6A:
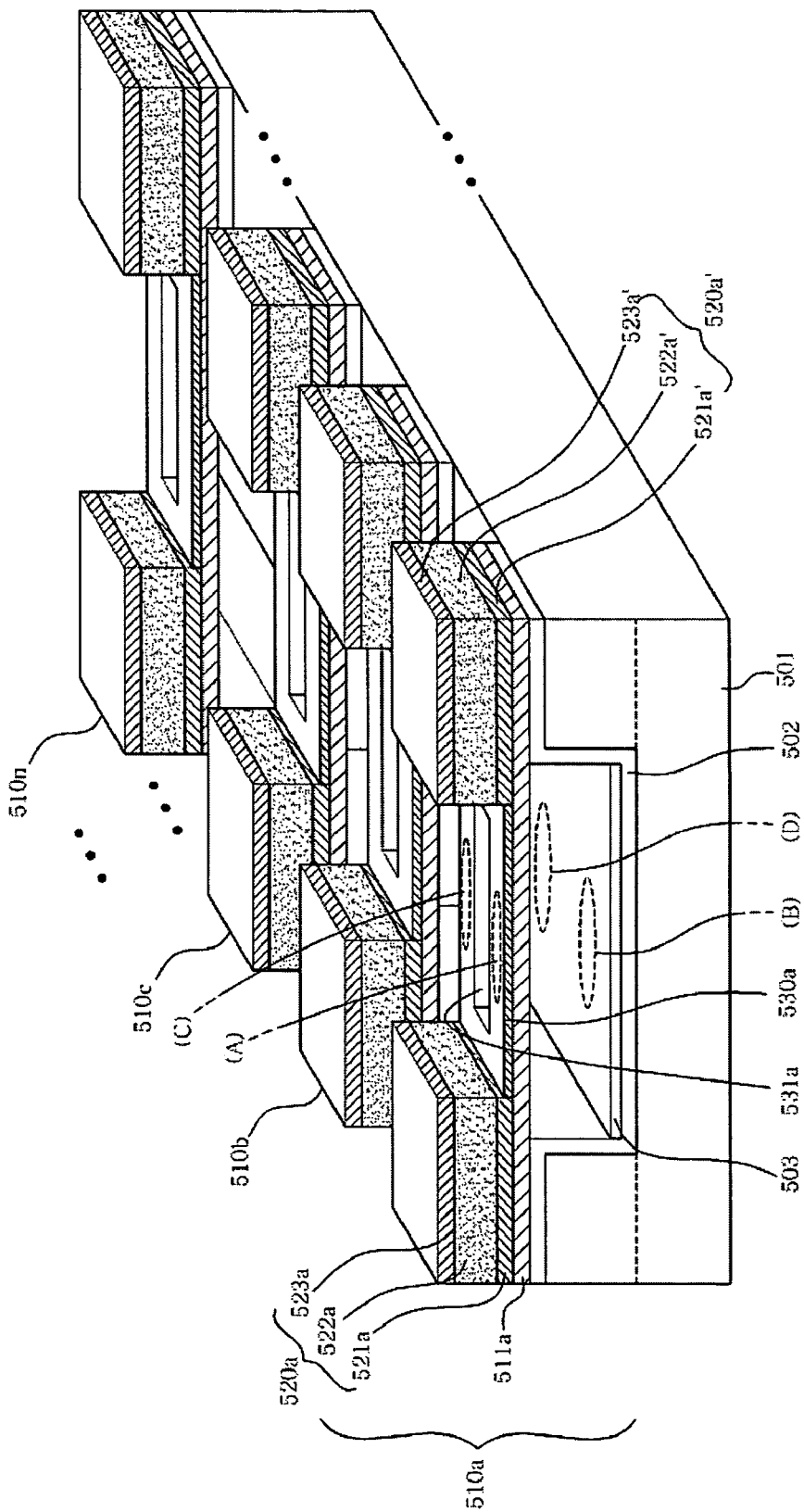
FIG. 6A is a perspective view of the diffractive type optical modulator of FIG. 2.
Figure 6B:
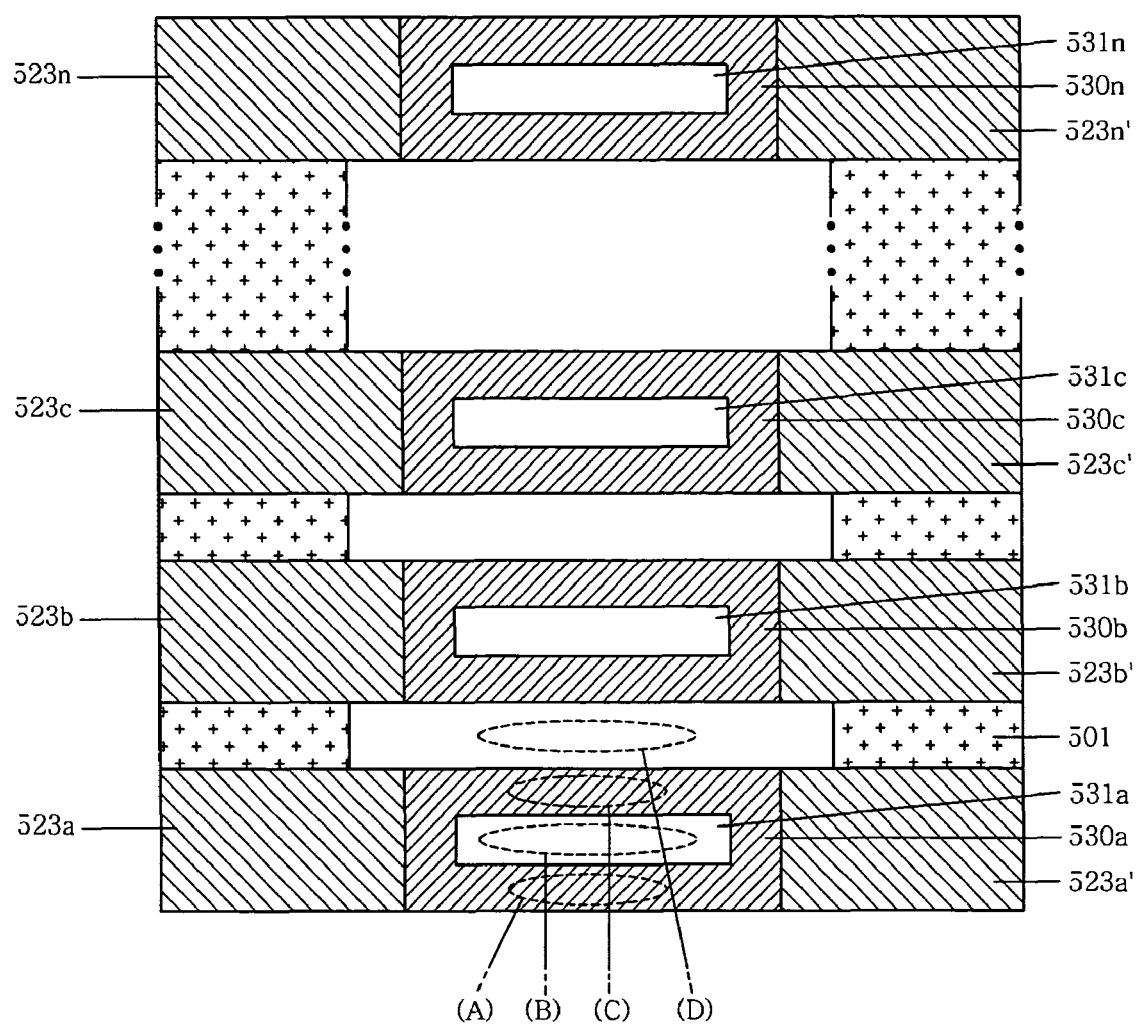
FIG. 6B is a plane view of the diffractive-type optical modulator of FIG. 2.

That is, raster type standard input image data, as shown in FIG. 4A, is arranged in a transverse direction. However, the diffractive optical modulator 153 of the light modulation optical system 150, as shown in FIGS. 6A and 6B, includes a plurality of micromirror that are arranged in a longitudinal direction, so that it allows an image to be displayed with transverse scanning.

Accordingly, the light modulation optical system 150 using the diffractive optical modulator 153 requires 480 pieces of data arranged in the longitudinal direction to scan a single frame of image data that is composed of 480×640 pixels.

Figure 5A:
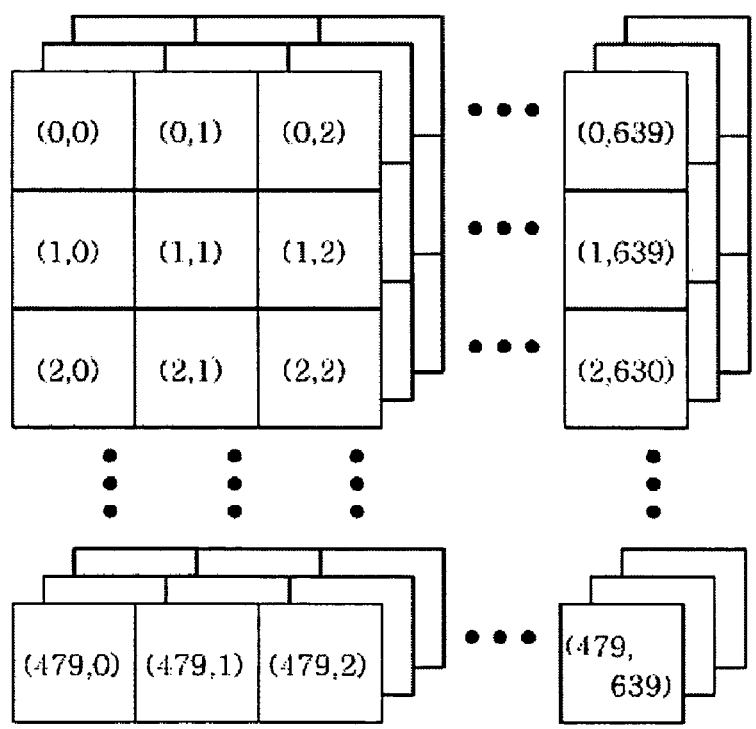
FIG. 5A is a diagram showing the structure of a single frame of image data that is composed of 480×640 pixels.

FIG. 5A is a diagram showing the structure of a single frame of image data that is composed of 480×640 pixels. The image data shown in FIG. 5a is received from the outside in the transverse direction, that is, the image data is input in order of (0,0), (0,1), (0,2), (0,3) . . . .

Figure 5B:
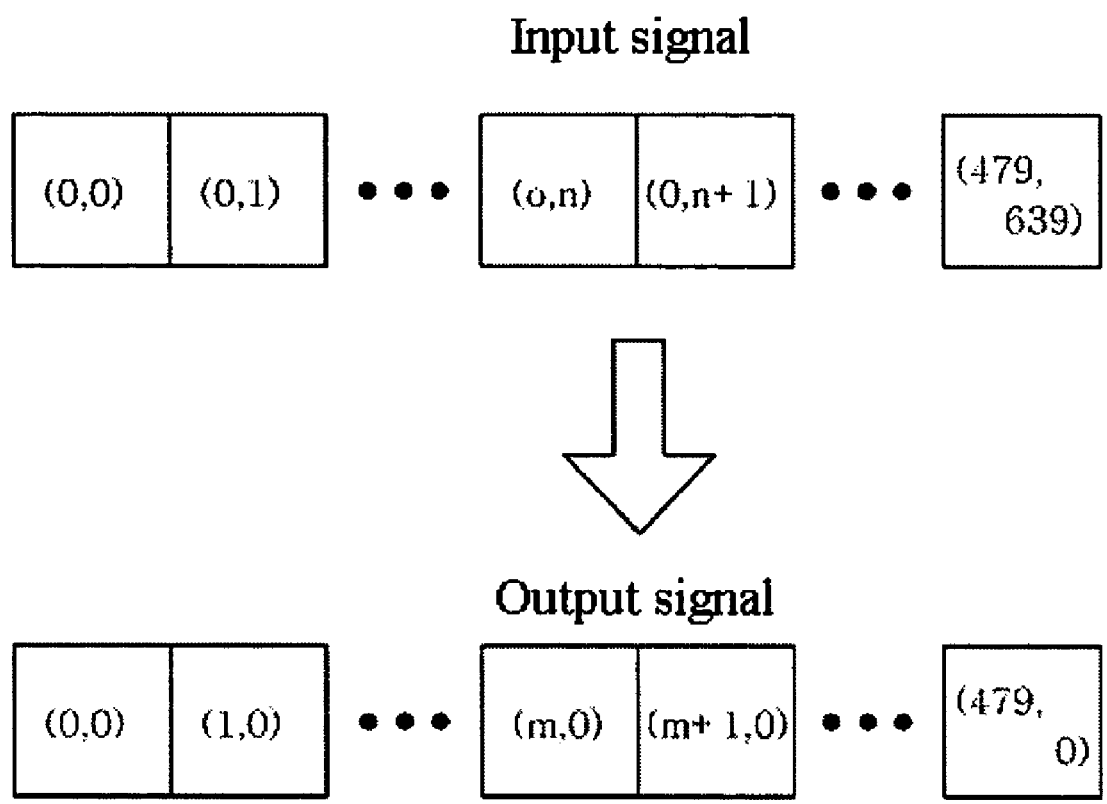
FIG. 5B is a diagram showing a structure in which the transverse arrangement of input image data is transposed into a longitudinal arrangement.

However, the light modulation optical system 150 using the diffractive optical modulator 153 requires 480 pieces of data arranged in a longitudinal direction, so that the input image data, as shown in FIG. 5B, must be transposed from a transverse arrangement to a longitudinal arrangement.

Furthermore, when receiving the projection control signal for requesting performance of a projection function from the multimedia processor 122, the drive signal control unit 146 of the projection control unit 140 receives image data, which is obtained by transposing data, from the image data processing unit 144 in the longitudinal direction, controls the light source system 151 and the diffractive optical modulator 153 and, therefore, generates an image using the diffracted light.

Meanwhile, the light source system 151 of the light modulation light source system 150 includes a plurality of light sources (for example, a light source R 151R, a light source G 151G, and a light source B 151B). The light source system 151 also includes a condensing/light synthesizing unit 151S, and condenses and emits a plurality of light beams. When the light source system 151 emits the light source R 151R, the light source G 151G, and the light source G 151B in a time-division or sequential manner in the case of one-panel scheme similar to the embodiment of the present invention, that is, the case where one diffractive optical modulator 153 is used, it is not necessary to provide a separate color wheel (a device that is capable of dividing a multiplexed beam according to color and time) at the front end or rear end of the diffractive optical modulator 153. When the light source system 151 emits a plurality of light sources in the form of a multiplexed beam, that is, emitting it without performing time-division, it is necessary to provide a separate color wheel (a device that is capable of dividing a multiplexed beam according to color and time) (not shown) at the front end or the rear end of the diffractive optical modulator 153.

For example, in the case where the light source R 151R, the light source G 151G, and the light source B 151B are used, the condensing unit 151S may be formed of one reflecting mirror (51RS of FIGS. 1A and 1B) and two dichronic mirrors (51GS and 51BS of FIGS. 1A and 1B). Light beams R, G and B are condensed to thus form a multiplexed beam, so that a single illumination system can be formed.

Thereafter, the illumination optical unit 152 changes the light beams, which are emitted from the light source system 151, into linearly paralleled light and caused the linearly paralleled light to enter into the light diffractive optical modulator 153.

When the linearly paralleled light enters from the illumination optical unit 152, the diffractive optical modulator 153 performs light modulation and forms diffracted light having a plurality of diffractive orders, thus forming an image (in this case, of the diffracted light having a plurality of diffractive orders, diffracted light having one or more diffractive orders may be used to form the image). An example of the diffractive optical modulator 153 includes an open hole-based diffractive optical modulator, which is shown in FIG. 6a. As shown in FIG. 6A, the open hole-based diffractive optical modulator used for the present invention is composed of a silicon substrate 501, an insulation layer 502, a lower micromirror 503, a plurality of elements 510a to 510n. In this case, although the insulation layer and the lower micromirror are formed on different layers, the insulation layer itself may function as the micromirror when the insulation layer has a characteristic of reflecting light lower.

The silicon substrate 501 is provided with a recess to provide an air space for elements 510a to 510n, an insulation layer 502 is disposed on the silicon substrate 501, a lower micromirror 503 is deposited on the insulation layer 502, and the lower surfaces of elements 510a to 510n are attached on the two side of the recess. The silicon substrate 501 may be formed of a material, such as Si, Al2O3, ZrO2, Quartz or SiO2, and the bottom and top of the recess (in FIG. 6a, indicated by dotted lines) may be formed of heterogeneous materials different from each other.

The lower micromirror 503 is deposited on the upper portion of the silicon substrate 501, and causes incident light to be diffracted using reflection. The lower micromirror 503 may be formed of material such as metal (Al, Pt, Cr or Ag).

Each of the elements (although only a description of an element indicated by reference numeral 510a is representatively made, the others are the same) has a ribbon shape, and is provided with a lower support 511a, the lower surfaces of opposite ends of which are attached on two sides beside the recess of the silicon substrate 501 such that the center portion of the element is spaced apart from the recess of the silicon substrate 501.

Piezoelectric layers 520a and 520a' are provided on the two side the lower support 511a, and generate the drive force of the element 510a using the contraction and expansion of the piezoelectric layers 520a and 520a'.

A material for forming the lower support 511a may be Si oxide-based material (for example, $SiO_2$), Si nitride-based material (for example, $Si_3N_4$), a ceramic substrate (Si, $ZrO_2$, or $Al_2O_3$), Si carbide, or the like. The lower support 511a may be omitted according to need.

Furthermore, the left and right piezoelectric layers 520a and 520a' includes lower electrode layers 521a and 521a' for providing piezoelectric voltage, piezoelectric material layers 522a and 522a' disposed on lower electrode layers 521a, 521a' and configured to generate upward and downward drive forces due to contraction and expansion when voltage is applied to the two sides thereof, and upper electrode layers 523a and 523a' disposed on the piezoelectric material layers 522a and 522a' and configured to provide piezoelectric voltage to the piezoelectric material layers 522a and 522a'. When voltage is applied to the upper electrode layers 523a and 523a' and the lower electrode layers 521a and 521a', the piezoelectric material layers 522a and 522a' are contracted or expanded, thus causing the lower support 511a to move upward or downward.

The electrodes 521a, 521a', 523a and 523a' may be formed of electrode material, such as Pt, Ta/Pt, Ni, Au, Al, or $RuO_2$, and the electrode materials are deposited within a range of 0.01 to 3 μm using a sputter method, an evaporation method or the like.

Meanwhile, an upper micromirror 530a is deposited on the center portion of the lower support 511a, and a plurality of open holes 531a1 to 531a4 are formed thereon. In this case, although it is preferred that each of the open holes 531a1 to 531a4 be formed in a rectangular shape, they may be formed in any closed-curve shape, such as a circular shape or an oval shape. Furthermore, in the case where the lower support is formed of a light-reflective material, it is not necessary to separately deposit the upper micromirror, and it is possible to allow the lower support to function as the upper micromirror.

The open holes 531a1 to 531a4 allow light incident on the element 510a to pass through the element 510a and to be incident on the portions of the lower micromirror layer 503 corresponding to the open holes 531a1 to 531a4, thus allowing the lower micromirror layer 503 and the upper micromirror layer 503a to form pixels.

That is, for example, portion (A) of the upper micromirror layer 530a, through which the open holes 531a1 to 531a4 are formed, and portion (B) of the lower micromirror layer 503 may form a single pixel.

In this case, incident light, which has passed through the portion of the upper micromirror layer 503a through which the open holes 531a1 to 531a4 are formed, can be incident on the corresponding portion of the lower micromirror layer 503. When the interval between the upper micromirror layer 530a and the lower micromirror layer 530 is an odd multiple of $\lambda/4$, maximally diffracted light is generated.

In this case, incident light, which has passed through the portion of the upper micromirror layer 503a through which the open hole 531a is formed, can be incident on the corresponding portion (B) of the lower micromirror layer 503. When the interval between the upper micromirror layer 530a and the lower micromirror layer 530 is an odd multiple of $\lambda/4$, maximized intensity of light is generated.

Furthermore, in the open hole-based diffractive optical modulator of FIG. 6a, the open hole 531a is formed in a rectangular shape, and the longitudinal sides of the open hole 531a are formed so as to be paralleled in a direction in which the element 510a extends across the silicon substrate 501. As can be seen in the plan view of FIG. 6B, when the distances between the elements 510a to 510n are maintained so as to be wide, a void space under elements 510a to 510n (reference numeral D) and area (C) adjacent to the upper micromirror 530a forms part of a single pixel composed of (A), (B), (C) and (D), so that light loss can be reduced and, therefore, light efficiency can increase Still referring to FIGS. 6A and 6B, sections (A) and (C) on the micromirror layer 503A serve as reflecting surfaces. Also, the portion identified as (B) of the lower micromirror layer 503 corresponding to an open hole 531a, as well as a portion of the substrate 501 corresponding to reference number (D) also serves as a reflecting surface. The widths of reflecting areas (A), (B), (C) and (D) may all be substantially the same so as to efficiently form a single pixel. It may be that the widths of areas or sections (B) and (D) may be slightly wider than the widths of areas or sections (A) and (C). The reason that the widths of sections (B) and (D) may be slightly wider is that some diffractive loss occurs as light passes down through the open hole 531 or passes down between adjacent upper electrode layers 523 to the lower micromirror layer 503 and also when the light reflects back from the micromirror layer through the open holes 531 and between the electrode layers 523. For example, the widths of sections (A) and (C) may be approximately 3.9 micrometers, whereas the widths of sections (B) and (D) may be approximately 4.1 micrometers.

Meanwhile, the filter unit 154, for example, may be composed of a Fourier lens (54A of FIGS. 1A and 1B) and a filter for each section (54B of FIGS. 1A and 1B). The filter unit 154 divides diffracted light according to order and passes diffracted light having a desired order therethrough.

Furthermore, the projection optical unit 155 enlarges and projects an image. The scanning unit 156 scans incident diffracted light onto the screen 160 to generate an image onto the screen 160, thus allowing the user to view the image.

Meanwhile, the diffracted light formed by the diffractive optical modulator 153 has a plurality of orders of diffractive coefficients. When diffracted light having 0-order of diffraction coefficient is used, high relative output can be produced using relatively lower power, and power consumption also can be reduced relative to using diffractive light of other diffractive orders, so that it can be used for a mobile terminal when lower power consumption rates are desired. Furthermore, when, of the diffracted light formed by the diffractive optical modulator 153, 0-order diffracted light is used, diffracted light is not dispersed unlike +1-order diffracted light and −1-order of diffracted light +1 order diffracted light, so that a large lens system, which is used to condense diffracted light when −1-order diffracted light is used, is unnecessary and, therefore, compactness can be more easily achieved.

Furthermore, the 0-order diffracted light has a larger depth of focus in contrast to the +1-order diffracted light or the −1-order diffracted light screen 160, which may be important for a mobile terminal, where the screen being used may not be in a fixed location. The depth of focus refers to information indicating that an image can be clearly viewed to some extent at the front and rear positions of a focused object. Since the 0-order diffracted light is a single light beam, the depth of focus of the 0-order diffracted light is deeper than that of 0- or height order diffracted light, which condenses and uses the positive (+) order diffracted light and negative (−) order diffracted light. That is, in the case where the 0- or higher order diffracted light is used, focus is formed while positive (+) order diffracted light and negative (−) order diffracted light crosses, so that the depth of focus is shallow. Accordingly, the screen 160 is not fixed as in the mobile terminal, but the user may optionally determine the setting of the screen 160. Furthermore, the large depth of focus is necessary in an application in which focus is adjusted using the naked eye. The 0-order diffracted light can satisfy this necessity.

Although the above described light modulation optical system 150 is configured to generate an image using a single diffractive optical modulator image, three diffractive optical modulators that divide light according to color, which is called a three-panel scheme, may be used to generate an image. In this case, three illumination optical units are separately necessary, and a color synthesizing system is further necessary at the rear side of the diffractive optical modulator.

The operation of the mobile terminal having the optical modulator of a projector according to the present invention is described in detail with reference to the accompanying drawings below.

When a user selects a projection mode using a key input unit 112 to project an image on screen 160 (the projection mode is provided to the user through a menu) and selects an image desired to be projected onto the screen 160, the baseband processor 116 transmits a projection control signal to the multimedia processor 122 such that image data, corresponding to the image selected by the user, is transmitted to the projection control unit 140.

Thereafter, the multimedia processor 122 transmits the projection control signal to the drive signal control unit 146, and transmits image data, which is read from the memory 114, to the image input unit 140.

Meanwhile, the image input unit 140 of the projection control unit 140 transmits the image data, which is received from the multimedia processor 122, to the image data processing unit 144. The image data processing unit 144 performs transposing on the image data and outputs the transposed image data to the drive signal control unit 146.

Thereafter, when receiving the projection control signal from the multimedia processor 122, and the image data from the image data processing unit 144, the drive signal control unit 146 transmits a light source control signal based on the received image data to the light source system 151 and causes the light source system 151 to generate a light source.

Furthermore, the drive signal control unit 146 outputs the drive control signal based on the image data to the drive integrated circuit 157. The drive integrated circuit 157 receiving the drive control signal generates a driving signal based on the drive control signal and, thereby, drives the diffractive optical modulator 153.

Furthermore, the drive signal control unit 146 outputs a scanning control signal to the scanning unit 156. The scanning unit 156 performs scanning such that the image is scanned onto the screen 160 and, therefore, allows the image to be displayed onto the screen 160.

Meanwhile, the light source system 151 is driven in response to the light source control signal received from the drive signal control unit 146 and sequentially generates and emits light beams R, G, and B.

Thereafter, the illumination optical unit 152 causes the light beams, which are generated by the light source system 151, to be entered into the diffractive optical modulator 153.

Thereafter, the diffractive optical modulator 153 is driven in response to the received drive signal, modulates incident light received from the illumination optical unit 152 modulate, forms diffracted light having a plurality of diffractive orders and, therefore, generates an image.

Thereafter the filter unit 154, for example, passes 0-order diffracted light, which belongs to the diffracted light having a plurality of diffractive orders generated by the diffractive optical modulator 153, therethrough, and interrupts diffracted light having the other orders.

Thereafter, the projection optical unit 155 enlarges and projects the diffracted light passing through filter unit 154, and the scanning unit 156 performs scanning in response to the scanning control signal received from the drive signal control unit 146 and, therefore, display the image onto the screen 160. Scanning unit can be of various types including an oscillating mirror-type scanner, a rotating head-type scanner, etc.

Meanwhile, although, in the present invention described above, descriptions of the case where the projector with an optical modulator is provided in the mobile terminal have been made, the case where the optical modulator of the projector is provided outside the mobile terminal may be identically implemented. In this case, connection with the terminal control system is possible by connecting the projector to the connector of the mobile terminal using a connection jack.

As described above, in the accordance with the present invention, the limitation in the size of an LCD screen that is incurred in the conventional mobile terminal can be overcome when a projection function is realized using an optical modulation projector.

Furthermore, in accordance with the present invention, a small-sized battery can be used because the projection function is realized using a low-power optical modulator.

Furthermore, in accordance with the present invention, it is possible to make the mobile terminal compact because compactness of the optical modulation projector with an optical modulator is possible.

Although embodiments of the present invention have been disclosed for illustrative purposes, those skilled in the art will appreciate that various modifications, additions and substitutions are possible, without departing from the scope and spirit of the invention as disclosed in the accompanying claims.

For example, the filter 154 can be located anywhere downstream of the optical modulator 153. For instance, the filter can be located downstream and adjacent the projection optical unit 155 or downstream and adjacent the scanning unit 156. Moreover, the filter can be incorporated into the scanning unit 156 itself.

Further, other types of diffractive light modulators may be used in conjunction with the present invention. Such other diffractive light modulators may include GLV modulators, piezoelectric-type modulators with or without open holes, as well as hybrid-type modulators. An example of a GLV diffractive light modulators is disclosed by Bloom U.S. Pat. No. 5,311,360, incorporated herein. Examples of piezoelectric diffractive light modulators are disclosed by U.S. patent application Ser. Nos. 10/952,556 and 10/952,573, incorporated herein by reference. An example of a hybrid diffractive light modulator is disclosed by U.S. patent application Ser. No. 10/951,556 incorporated herein by reference.

As a further example of a contemplated modification and/or substitution, in place of a RGB light source, a single point light source may be used instead. The light from such single point light source can be scanned into two dimensions to produce a two dimensional display in a well known manner. The single point light source may be from a single diode or from a diffractive unit that generates a single light pixel.

What is claimed is:

1. A mobile terminal having an optical modulation projector, comprising:
   a. a control system for outputting a projection control signal and image data;
   b. a projection control system for receiving the image data from the control system, and generating and outputting a drive control signal depending on the image data;
   c. an optical modulation system for generating and modulating light and generating an image in response to the drive control signal, and performing scanning to generate an image projectable onto a screen;
   d. wherein the optical modulation system comprises:
      a light source system for generating and emitting light beams;
      a drive integrated circuit for generating and outputting a drive signal;
      a diffractive optical modulator configured to be driven in response to the input drive signal, modulate the incident light and generate an image based on the drive signal;
      an illumination optical unit for directing the light beams, which are emitted from the light source system, to the optical modulator;
      a projection optical unit for projecting an image emitted from the optical modulator; and
      a scanning unit for generating a two-dimensional image from the image received from the projection optical unit;
   e. wherein the diffractive optical modulator comprises:
      a base member;
      a plurality of first reflection parts arranged to form an array, and configured to be supported by the base member, a portion of each of the first reflection parts being spaced apart from the base member, a surface of the first reflection parts opposed to the base member is formed of a reflective surface to reflect incident light, and one or more open holes are formed to pass the incident light therethrough;
      a second reflection part configured to be spaced apart from the first reflection parts and having a reflection surface for reflecting incident light that passes through the open holes of the first reflection parts; and
      a plurality of actuating units for moving a corresponding first reflection part so as to move away from or toward the second reflective part in response to a drive signal received from the drive integrated circuit, thus changing the amount of diffracted light that is generated by light reflected from the first reflection parts and the second reflection parts, and
   f. wherein the actuating units comprise:
      a first piezoelectric layer which is positioned at a first end thereof on a first end of the first reflection part, and at a second end thereof on a first side of a center portion of the first reflection part to be spaced apart from the center of the first reflection part, with a piezoelectric material layer provided in the first piezoelectric layer to provide a vertical actuating force through shrinkage and expansion when voltage is applied to both sides of the piezoelectric material layer, and
      a second piezoelectric layer which is positioned at a first end thereof on a second end of the first reflection part, and at a second end thereof on a second side of the center of the first reflection part to be spaced apart from the center of the first reflection part, with a piezoelectric material layer provided in the second piezoelectric layer to provide a vertical actuating force through shrinkage and expansion when voltage is applied to both sides of the piezoelectric material layer.

2. The mobile terminal as set forth in claim 1, wherein the light modulation optical system and the projection control system are disposed outside the mobile terminal in the form of a module.

3. The mobile terminal as set forth in claim 1, wherein the optical modulation system is disposed outside the mobile terminal in form of a module.

4. The mobile terminal as set forth in claim 1, wherein the control system comprises a base-band processor that outputs a projection control signal to the projection control system, and outputs the image data to the projection control system.

5. The mobile terminal as set forth in claim 1, wherein the control system comprises:
   a base-band processor for outputting a projection control signal; and
   a multimedia processor for outputting the projection control signal to the projection control system when the projection control signal is received from the base-band processor, and outputting the image data to the projection control system.

6. The mobile terminal as set forth in claim 1, wherein the image generated is composed of zero order diffractive light.

7. The mobile terminal as set forth in claim 1, wherein the light source system comprises:
   a plurality of light sources for generating light of different colors; and
   a condensing unit for condensing light beams emitted from the plurality of light sources.

8. The mobile terminal as set forth in claim 1, wherein the optical modulator is linear optical modulator generating a linear image from the light received from the illumination optical unit.

9. The mobile terminal as set forth in claim 1, wherein the two-dimension image generated from the image received from the projection optical unit is composed of zero order modulated light.

10. The mobile terminal as set forth in claim 1, wherein the diffractive optical modulator generates an image by diffracting the light received from the illumination optical unit.

11. The mobile terminal according to claim 10, wherein the diffractive optical modulator is a linear diffractive modulator generating a linear image from the light received from the illumination optical unit.

12. The mobile terminal according to claim 10, wherein the two-dimensional image generated from the image received from the optical modulator is composed of zero order diffracted light.

13. The mobile terminal as set forth in claim 10, further comprising a filter unit disposed at a location subsequent to the diffractive optical modulator and configured to pass a 0-order diffraction light, from the plurality of order diffraction light generated by the diffractive optical modulator.

14. The mobile terminal according to claim 13, wherein the filter unit is incorporated into the scanning unit.

15. The mobile terminal as set forth in claim 1, wherein each of the first reflection parts comprises an open hole disposed in a direction transverse to the length of the base member.

16. The mobile terminal as set forth in claim 15, wherein the first reflection parts define a reflective surface having a width similar in width to the gap separating the first reflection parts.

17. The mobile terminal as set forth in claim 1, wherein the projection control unit comprises:
- an image input unit for receiving image data from the control system;
- an image data processing unit for processing the image data received through the image input unit and outputting processing results; and
- a drive signal control unit for generating a drive control signal depending on the image data and outputting the generated signal to the optical modulation system.

* * * * *